United States Patent [19]
Greutter

[11] 3,866,725
[45] Feb. 18, 1975

[54] LOAD-DEPENDENT BRAKING DEVICE FOR CONVEYING SYSTEMS

[75] Inventor: Wilfried Greutter, Vienna, Austria

[73] Assignee: Inventio AG, Hergiswil, Switzerland

[22] Filed: July 23, 1973

[21] Appl. No.: 381,976

[30] Foreign Application Priority Data
July 26, 1972 Switzerland............. 11239/72

[52] U.S. Cl.............. 188/134, 188/180, 192/104 R
[51] Int. Cl.............................................. B60t 7/12
[58] Field of Search...... 188/70 R, 106 R, 134, 180, 188/181 R, 181 A, 187, 105, 75; 192/104 R

[56] References Cited
UNITED STATES PATENTS
| | | | |
|---|---|---|---|
| 1,720,766 | 7/1929 | Spahr............................ | 188/187 UX |
| 2,033,835 | 3/1936 | Lansing........................... | 192/104 R |

*Primary Examiner*—Duane A. Reger
*Attorney, Agent, or Firm*—Werner W. Kleeman

[57] ABSTRACT

A load-dependent braking device for conveying systems having a primary brake with a fixedly adjusted braking moment and a secondary brake with variable braking moment, the braking moment of the secondary brake being adjusted in dependence on the loading moment acting upon a drive device or machine for the attainment of a braking deceleration or retardation independent of load. A rotatable brake part of the primary brake is rigidly connected with a fixed brake part of the secondary brake. A rotatable brake part of the secondary brake, which can be pressed by brake linings or pads against the fixed brake part through the action of spring pressure, is raised or lifted-off as a function of the change of speed occurring during the braking of the drive machine by a rod or linkage arrangement pressed by means of spring force against a setting cam. The setting cam is arranged on a flywheel or inertial disk mounted to be freely rotatable upon a drive shaft of the drive device and actuates the rod arrangement in proportion to the angle of displacement between the flywheel disk and the drive shaft in opposition to the spring force.

12 Claims, 4 Drawing Figures

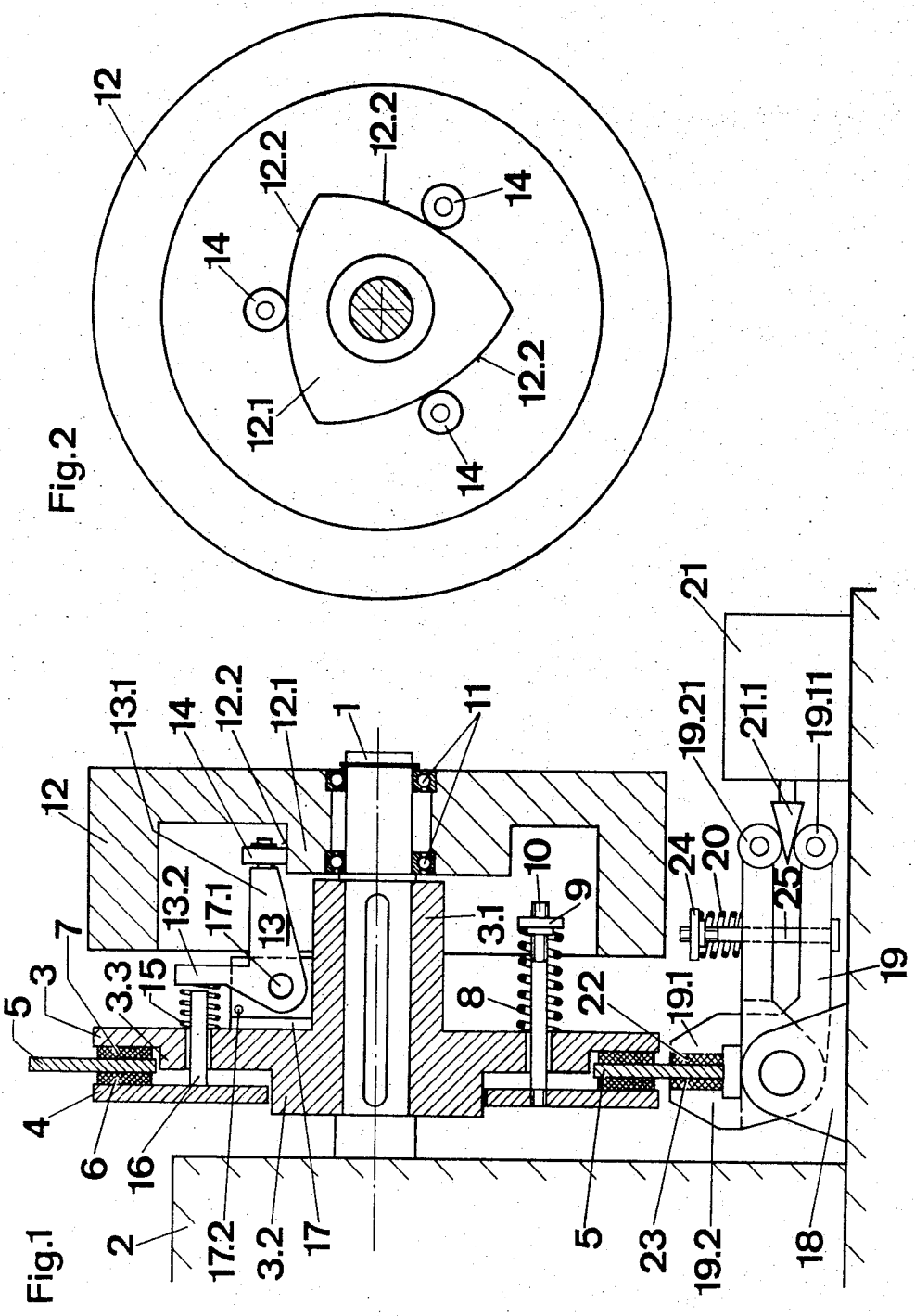

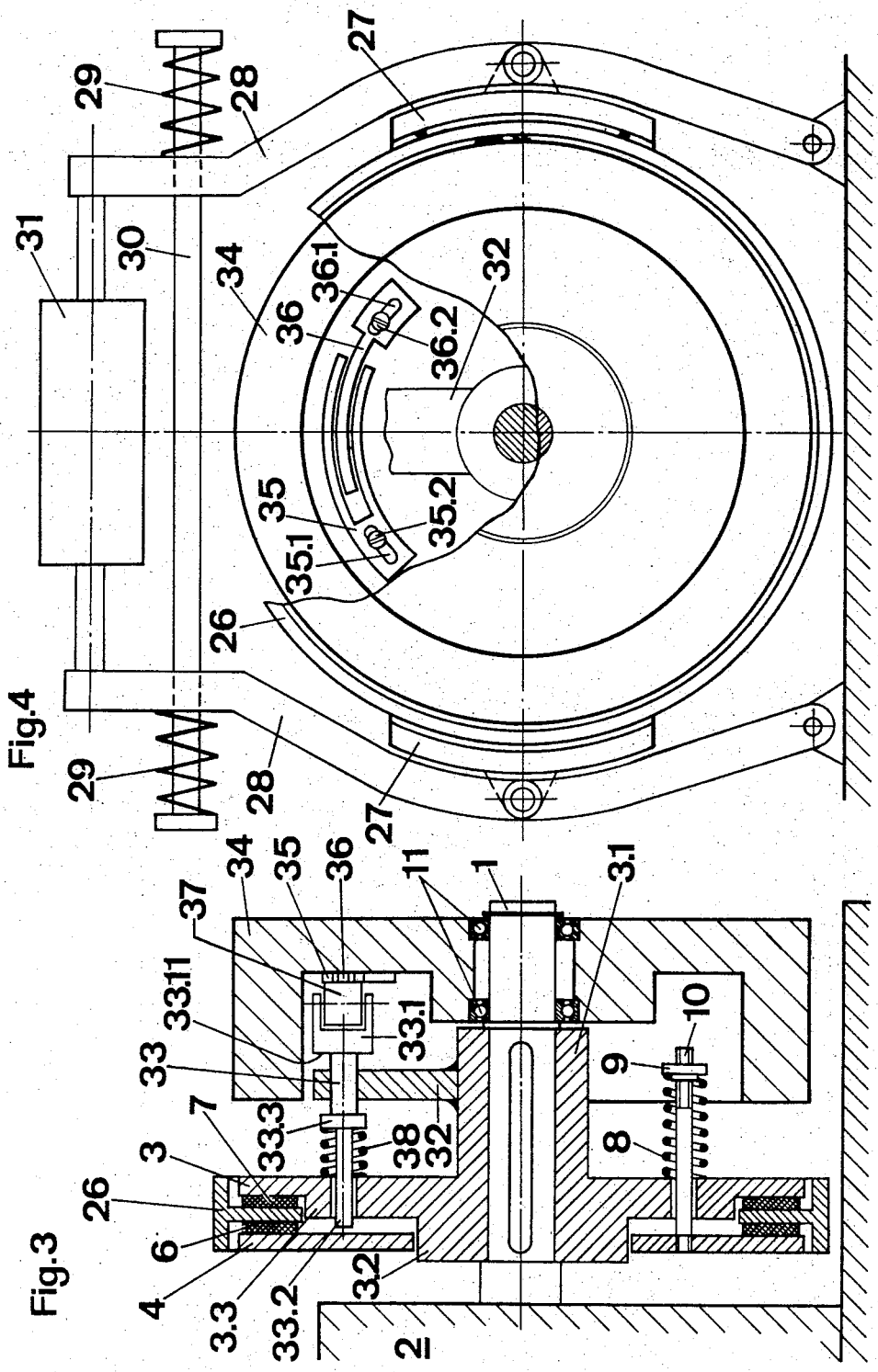

LOAD-DEPENDENT BRAKING DEVICE FOR CONVEYING SYSTEMS

BACKGROUND OF THE INVENTION

The present invention relates to a new and improved construction of a load-dependent braking device for conveying systems which is of the type having a primary brake with a fixedly adjusted braking moment and a secondary brake with variable or alterable braking moment, wherein the braking moment of the secondary brake is adjusted in dependence on the loading moment acting on a drive device or machine for the attainment of a braking deceleration or retardation independent of load.

Conveying systems, such as for example passenger conveyor belts, escalators and so forth in general possess a service or operating brake with a fixedly adjusted braking moment. In particular, in the case of long conveyor belts and escalators, where large loading difference occur between the unloaded and the fully loaded operating condition, in the event of braking with constant braking moment there prevail for different operating conditions quite different braking retardations and braking paths which, in the case of oblique conveyors, such as for example escalators, are furthermore dependent upon the direction of travel. However, since the longest braking paths for achieving an effective emergency braking may not exceed a determined length, it is necessary to fixedly adjust a relatively large braking moment at the brake. As a result, during the braking of small loads very large braking retardations or decelerations occur, which in some instances can lead to ejection or sliding of the load, and, in particular in the case of passenger conveyors and escalators, to falling and injuries to passengers.

It has already been proposed in the art, for the achievement of a load-independent constant braking retardation, to provide a service brake with a braking moment which varies as a function of the load.

In the case of a prior art brake of such type the braking moment of the service brake is altered electromechanically with the aid of electronic regulating circuits as a function of load. However, such braking systems are very expensive, and particularly in the event of current failure generally do not fulfill the appropriate safety regulations, since they require a current circuit which is closed during the braking process and which is generally not permissible.

Another state-of-the-art load-dependent braking device operates with two brakes and a load measuring switch. The first brake generates the braking force when the excitation is switched-off, while the second brake, depending upon the setting of the load measuring switch, in its excited state generates two different braking moments. This braking device does not afford any continuous adaption of the braking moment to the momentarily encountered load condition. Further, in the event of current failure no load-dependent braking moment is generated.

SUMMARY OF THE INVENTION

Hence, in view of the above discussion it will be recognized that this particular field of technology is still in need of a load-dependent braking device for conveying systems which is not associated with the aforementioned drawbacks and limitations of the prior art proposals. Thus, it is a primary object of the present invention to provide an improved construction of load-dependent braking device for conveying systems which effectively and reliably fulfills the existing need in the art and is not associated with the aforementioned drawbacks and limitations of the state-of-the-art proposals.

Another and more specific object of the present invention is directed to the provision of a new and improved construction of load-dependent braking device requiring no great expenditure in terms of its construction and design as well as fabrication costs, and furthermore, capable of generating a braking moment continuously adapted to the momentarily encountered load condition and fully effective even in the event of power failure.

Still a further object of the present invention is directed to the provision of a load-dependent braking device for conveying systems which is extremely reliable in operation, economical to manufacture, not readily subject to breakdown, requires a minimum of servicing and maintenance, and generally provides for a braking action correlated to the prevailing load conditions.

Now in order to implement these and still further objects of the invention, which will become more readily apparent as the description proceeds, the load-dependent braking device of this development contemplates that a rotatable brake part or component of the primary brake is rigidly connected with a fixed brake part or component of the secondary brake, that a rotatable brake part of the secondary brake, which can be pressed by means of brake pads or linings against the fixed brake part by spring pressure, is lifted-off or cleared as a function of the change of speed occurring upon braking of the drive device or machine by means of a rod or linkage arrangement pressed by spring force against a setting or adjustment cam means. The setting cam means is arranged at a flywheel disk or plate mounted to be freely rotatable upon a drive shaft and actuates the rod arrangement in proportion to the angle of displacement between the flywheel disk or plate and the drive shaft and in opposition to the spring force.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a sectional view of a first embodiment of load-dependent braking system or device designed according to the teachings of the present invention;

FIG. 2 is an elevational view showing details of the flywheel disk and setting cams as the same is employed in the embodiment of load-dependent braking system depicted in FIG. 1;

FIG. 3 is a sectional view of a second embodiment of load-dependent braking system or device; and FIG. 4 is an elevational view of the embodiment of load-dependent braking system depicted in FIG. 3.

DETAILED DESCRIPTION OF THE PREFERRED EMBODIMENTS

Describing now the drawings, in FIG. 1 reference numeral 1 designates the drive shaft of a drive device or machine 2 serving to drive a conventional conveying system, such as for instance an escalator, passenger conveyor belt or the like, which has not been shown in detail in order to preserve clarity in illustration. A carrier or support disk 3 of a secondary disk brake is keyed or otherwise suitably connected with the drive shaft 1. The carrier or support disk 3 possesses an elongated hub 3.1 and cylindrical projections or extensions 3.2 and 3.3. A pressure disk 4 is displaceably mounted on the projection 3.2 and a brake disk 5 is displaceably mounted on the projection 3.3. The brake disk 5, constituting the fixed brake part or component of the secondary brake, supports at the region of the carrier disk 3 and pressure disk 4 beyond which it protrudes, the brake pads or linings 6 and 7. Furthermore, this brake disk 5 is fixedly clamped between these two disks 3 and 4 by the brake springs 8 serving to press the pressure disk 4 against the carrier disk 3. For this purpose the brake springs 8 are each arranged upon a spring rod 10 which is guided through the carrier or support disk 3 and which is secured at one end in the pressure disk 4 and carries at the other end an adjusting or adjustment nut member 9. Hence these springs support themselves at one end at the carrier disk 3 and at the other end at the adjustment nut member 9, as best seen by referring to FIG. 1.

At the end of the drive shaft 1 which protrudes beyond the carrier or support disk 3 there is mounted for easy rotational movement a flywheel or inertial plate 12 by means of the ball bearings 11 or equivalent bearing devices. As best seen by referring to FIG. 2 the flywheel disk or plate 12, at the side confronting the carrier disk 3, is provided with a projection 12.1 having setting cam means constituted for example by three setting or adjustment cams 12.2 which are each offset with respect to one another through an angle of about 120°, and these three setting or adjustment cams collectively form an equilateral triangle, the sides of which are constituted by circular arcs having a radius which is greater than the smallest spacing between the setting cams and the lengthwise axis of the drive shaft. Against each of the adjustment or setting cams 12.2 there presses, under spring action, a respective roller 14 which is rotatably carried at one end of one arm 13.1 of an angle lever 13. This angle lever 13 is rotatably carried by means of an axle or pivot shaft 17.1 in a bearing block 17 secured to the carrier or support disk 3. Further, this angle lever 13 has imparted thereto a rotational moment through the action of a compression or pressure spring 15 which is supported at one end at the end of the other arm 13.2 of such associated angle lever 13 and at its other end of the carrier or support disk 3, as best seen by inspecting FIG. 1. A pressure pin 16 is arranged opposite the arm 13.2 and this pressure pin is piercingly guided through the carrier disk 3 and engages with the pressure disk 4 in such a manner that during the rotation or pivoting of the angle lever 13 the pressure pin or bolt 16 is actuated, against the opposing force of the spring 15 and after overcoming a small spring displacement, and thus lifts the pressure disk 4 off of the brake pad or lining 6 in opposition to the force of the brake springs 8. A stop or abutment 17.2 arranged at the bearing block 17 serves to limit the degree of rotation of each angle lever 13. The angle levers and associated pressure pins may be conveniently considered to define a rod or linkage arrangement.

The braking disk 5 constitutes the movable brake part or component of a primary brake having a fixedly set or adjusted braking moment. This primary brake, which is of conventional construction and designed as a disk brake, comprises a fork-like brake clamp 19 rotatably carried at a bearing block 18 and possessing the two forked clamp levers 19.1 and 19.2, a compression or pressure spring 20 for closing the brake clamp 19 and a clearing or lift-off device 21. The clamping side of the brake clamp or clamp means 19 is equipped with the brake pads or linings 22, 23 and acts upon the part of the brake disk 5 which protrudes past the carrier disk 3 and the pressure disk 4. The compression spring 20 bears at the actuation side of the brake clamp 19 at one end upon the brake clamp lever 19.2 and at the other end upon an adjustment or setting nut member 24. This adjustment nut member 24 is arranged at a spring rod 25 piercingly guided through the brake clamp lever 19.2 and secured at the brake clamp lever 19.1. The clearing device 21, for the purpose of spreading the brake clamp 19 by means of a wedge 21.1, acts upon the rollers 19.11 and 19.21 which are rotatably arranged at the actuation side at the forked clamp levers 19.1 and 19.2.

The braking device considered in conjunction with FIGS. 1 and 2 operates in the following manner: during the starting-up of the conveying system, the primary brake is vented or cleared by means of the clearing device 21. The carrier or support disk 3 is placed into rotation through the agency of the drive shaft 1, this carrier disk 3 entraining the flywheel disk 12 by means of the angle levers 13 and the rollers 14 which are pressed against the adjustment or setting cams 12.2. Due to the acceleration there occurs a displacement between the flywheel disk 12 and the carrier or support disk 3. Yet, running out of the rollers 14 over the setting or adjustment cams 12.2 is however prevented by the abutments or stops 17.2.

Upon attaining a constant operating rotational speed the carrier disk 3 and the flywheel disk 12 rotate in synchronism with the same rotational speed or number of revolutions, the rollers 14 coming to bear at the lowest point, i.e., the center of the setting cams 12.2.

During braking of the conveying system the primary brake is closed by interrupting the infeed of current to the clearing device 21, with the result that the brake disk 5 is braked. The carrier or support disk 3, which at the start of the deceleration or retardation action is still fixedly coupled with the brake disk 5 by means of the brake springs 8, the pressure disk 4 and the brake pads or linings 6, 7, therefore experiences a retardation or deceleration action. However, the flywheel disk 12 still strives to maintain its rotational speed. There is produced a displacement between the carrier or support disk 3 and the flywheel disk 12 which is proportional to the braking deceleration or retardation and therefore also proportional to the loading moment of the conveying system. This displacement brings about, through the action of the setting or adjustment cams 12.2, a lifting-off of the rollers 14, so that the arm 13.2 of an angle lever 13 is pressed against the pressure pin or bolt 16, and thus, the braking moment of the secondary brake is reduced as a function of the deceleration or load. In this manner there is realized a load-dependent approximately constant deceleration, which in turn ensures that with different loads of the conveying system for both directions of movement no persons are endangered or objects damaged during the braking retardation or deceleration action. The braking system also operates in a faultless manner even in the event of power failure and possesses a simple, stable construction.

The invention can be employed for most of the known brake systems, there only being necessary constructional adaptations which are within the skill of those versed in this particular art. There can be employed for the primary and/or secondary brakes internal and external shoe brakes or band brakes. According to the embodiment depicted by way of example in FIGS. 3 and 4, there are employed for instance as the primary brake an external shoe brake and as the secondary brake a disk brake, wherein also the actuation of the secondary brake through the agency of the flywheel disk is undertaken in a somewhat modified form. Of course, without requiring any really inventive ingenuity and within the concepts of the basic aspects of this development it would be possible to carry out a large number of other actuations.

Considering now the embodiment of load-dependent braking device as depicted in FIGS. 3 and 4, it is to be understood that those components which have been retained have been designated with the same reference characters as have been employed for the embodiment of FIG. 1. In this case there is provided a substantially T-shaped brake disk 26. Reference numeral 27 designates two brake shoes which engage with the brake disk 26 of the external shoe brake of conventional construction serving as the primary brake. These two brake shoes 27 are rotatably mounted at a brake lever linkage or rod arrangement 28. Reference numeral 29 designates the brake springs, reference numeral 30 the spring rod and reference numeral 31 the clearing device. Instead of an angle lever 13 there is secured an arm 32 to the elongated hub 3.1 of the carrier or support disk 3. This arm 32 serves as a guide for a pressure pin or bolt 33 provided instead of the pressure pin or bolt 16. The end of the pressure pin or bolt 33 confronting the flywheel disk 34 is constructed as a bearing yoke 33.1 in which there is rotatably mounted the roller 37 which is pressed against the setting or adjustment cams 35 and 36. The rear face or side 33.11 of the bearing yoke 33.1 serves as an abutment or stop for limiting the displacement of the pressure pin or bolt. The other end 33.2 of the pressure pin or bolt 33 is piercingly guided through the carrier or support disk 3 and, upon actuation of the pressure pin or bolt 33 after overcoming a small play, bears against the pressure disk 4. A compression or pressure spring 38, engaging between the carrier disk 3 and a projection 33.3 at the pressure pin 33, strives to press the roller 37 against the setting or adjustment cams 35 and 36. These setting or adjustment cams 35 and 36, which are secured by bolts 35.2 and 36.2 so as to be displaceable in slots 35.1 and 36.1 at the flywheel disk, are constructed in this case in a bifurcated or forked-like manner. The relevant fork prongs or tines of the two setting cams 35 and 36 engage with one another and continuously enlarge from the prong or tine end up to the region of the attachment end.

The braking device depicted in FIGS. 3 and 4 operates exactly similar to the embodiment disclosed in conjunction with FIGS. 1 and 2. The proposed construction of the setting or adjustment cams 35 and 36, however, allows for an exact accommodation of the braking characteristics of the secondary brake to the momentarily encountered conditions. Of course, it would also be possible to provide for the arrangement of FIG. 2 adjustable setting cams.

While there is shown and described present preferred embodiments of the invention, it is to be distinctly understood that the invention is not limited thereto but may be otherwise variously embodied and practiced within the scope of the following claims.

Accordingly, what is claimed is:

1. A load-dependent braking device for conveying systems comprising a primary brake possessing a fixedly adjusted braking moment, a secondary brake with a variable braking moment, the braking moment of the secondary brake being adjusted as a function of the loading moment acting upon a drive means for the attainment of a braking deceleration independent of load, the improvement comprising said primary brake having a rotatable brake part, the secondary brake having a fixed brake part and a rotatable brake part, the rotatable brake part of the primary brake being rigidly connected with the fixed brake part of said secondary brake, brake pad means, resilient means for exerting a spring pressure for urging the rotatable brake part of the secondary brake through the agency of the brake pad means against the fixed brake part of the secondary brake, setting cam means, a rod arrangement, means for providing a spring force for urging the rod arrangement against the setting cam means, said rod arrangement serving to lift-off the rotatable brake part of the secondary brake as a function of the change of speed which occurs upon braking of the drive means, said drive means including a drive shaft, a flywheel disk at which there is arranged said setting cam means, means for mounting said flywheel disk to be freely rotatable at the drive shaft, said setting cam means actuating the rod arrangement in opposition to the spring force in proportion to the angle of displacement between the flywheel disk and the drive shaft.

2. The load-dependent braking device as defined in claim 1, wherein the secondary brake is constructed as a disk brake and possesses a carrier disk connected with said drive shaft, said rod arrangement incorporating pressure pin means, said carrier disk having a projection, a pressure disk displaceably mounted upon said projection of said carrier disk, said rotatable brake part of said secondary brake comprising a brake disk provided with said pressure pad means, said brake disk and said pressure pad means being fixedly clampable under the action of said resilient means between said pressure disk and said carrier disk against the action of a clearing force which can be exerted via said pressure pin means piercingly extending through the carrier disk and engaging with the pressure disk, at least either said pressure disk or said carrier disk defining said rotatable brake part of said secondary brake.

3. The load-dependent braking device as defined in claim 2, wherein said rotatable brake part of said secondary brake comprises at least said pressure disk.

4. The load-dependent braking device as defined in claim 2, wherein said rotatable brake part of said secondary brake comprises both said pressure disk and carrier disk.

5. The load-dependent braking device as defined in claim 2, wherein said rod arrangement includes angle lever means rotatably mounted upon said carrier disk, said setting cam means arranged at the flywheel disk serving to actuate the pressure pin means of the secondary brake via said angle lever means, each angle lever means comprising a first lever arm and a second lever arm for actuation of the pressure pin means, a roller mounted at said first lever arm, said spring force providing means comprising a spring engaging with the second lever arm of the angle lever means, said spring pushing the angle lever means against the setting cam means via the roller.

6. The load-dependent braking device as defined in claim 2, further including an arm member secured to the carrier disk, said pressure pin means being displaceably mounted at said arm member, the end of the pressure pin means confronting the flywheel disk carrying a rotatable roller, said spring force providing means comprising a spring for pressing the pressure pin means via the rotatable roller against the setting cam means of the flywheel disk, a projection provided for pressure pin means, said spring being arranged between the carrier disk and said projection.

7. The load-dependent braking device as defined in claim 2, wherein said pressure pin means comprises three pressure pins angularly offset with respect to one another through an angle of about 120° at the carrier disk, said rod arrangement further including a respective roller for actuating each pressure pin for pressing the same against an associated one of three identical setting cams defining said setting cam means, said setting cams being displaceably arranged in offset relationship with respect to one another through an angle of about 120° at said flywheel disk.

8. The load-dependent braking device as defined in claim 2, wherein the flywheel disk possesses a projection, said setting cam means incorporating three identical setting cams arranged in angularly offset relationship with respect to one another through an angle of about 120° at said projection of the flywheel disk, said three identical setting cams forming an essentially equilateral triangle, the sides of which are constituted by circular arcs having a radius greater than the smallest spacing between each setting cam and the lengthwise axis of the drive shaft.

9. The load-dependent braking device as defined in claim 1, wherein said setting cam means arranged at the flywheel disk is constructed of two parts having inter-engaging fork tines, and means for securing said two parts of said setting cam means at said flywheel disk so as to be mutually displaceable within slots.

10. The load-dependent braking device as defined in claim 5, further including abutment means for limiting the actuating path of said pressure pin means and preventing running-out of the rollers beyond the setting cam means.

11. The load-dependent braking device as defined in claim 2, wherein there is provided a free spring displacement path for actuation of the pressure pin means and only upon overcoming of said free spring displacement path can said pressure disk be actuated.

12. The load-dependent braking device as defined in claim 1, wherein said primary brake and said secondary brake are disk brakes having a common brake disk forming the rotatable brake part for the primary brake and the fixed brake part for the secondary brake.

* * * * *